(12) United States Patent
Cook

(10) Patent No.: US 7,099,077 B2
(45) Date of Patent: Aug. 29, 2006

(54) OPTICAL SYSTEM HAVING THREE FIELDS OF VIEW USING TWO ALL-REFLECTIVE OPTICAL MODULES

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 43 days.

(21) Appl. No.: 11/029,728

(22) Filed: Jan. 5, 2005

(65) Prior Publication Data
US 2006/0146399 A1 Jul. 6, 2006

(51) Int. Cl.
G02B 17/00 (2006.01)
G02B 23/00 (2006.01)
G02B 5/08 (2006.01)
G02B 27/10 (2006.01)

(52) U.S. Cl. .................. 359/432; 359/365; 359/406; 359/429

(58) Field of Classification Search ........ 359/362–367, 359/402–406, 429, 432, 725–732, 850–861
See application file for complete search history.

(56) References Cited

U.S. PATENT DOCUMENTS

| | | | |
|---|---|---|---|
| 4,812,030 A * | 3/1989 | Pinson .................... 359/859 |
| 5,009,494 A | 4/1991 | Iossi et al. .................. 359/365 |
| 5,386,316 A * | 1/1995 | Cook ........................ 359/365 |
| 6,061,175 A | 5/2000 | Watters et al. ............. 359/366 |
| 6,084,727 A * | 7/2000 | Cook ........................ 359/850 |
| 6,118,583 A * | 9/2000 | Rogers ...................... 359/432 |
| 6,754,004 B1 * | 6/2004 | Granberg ................... 359/406 |
| 6,970,286 B1 * | 11/2005 | Kunick ...................... 359/366 |

* cited by examiner

*Primary Examiner*—Thong Q Nguyen
(74) *Attorney, Agent, or Firm*—John E. Gunther; Leonard A. Alkov; Karl A. Vick

(57) ABSTRACT

An all-reflective optical system includes an all-reflective afocal module, an all-reflective imaging module and an all-reflective switching structure being operated to direct a light beam through the afocal module and the imaging module. A first position of the switching structure directs the light beam to enter the first optical end of the afocal module and exit the second optical end of the afocal module, and thereafter to enter the input optical end of the imaging module. A second position of the switching structure directs the light beam to enter the second optical end of the afocal module and exit the first optical end of the afocal module, and thereafter to enter the input optical end of the imaging module. A third position of the switching structure directs the light beam to enter the input optical end of the imaging module so that the light beam completely bypasses the afocal module.

21 Claims, 10 Drawing Sheets

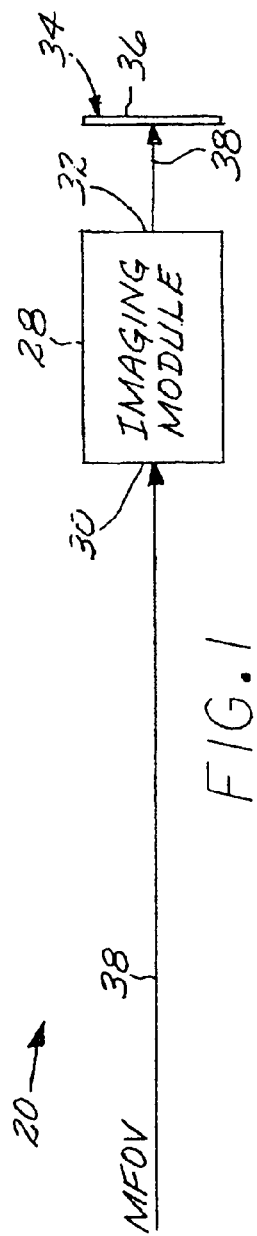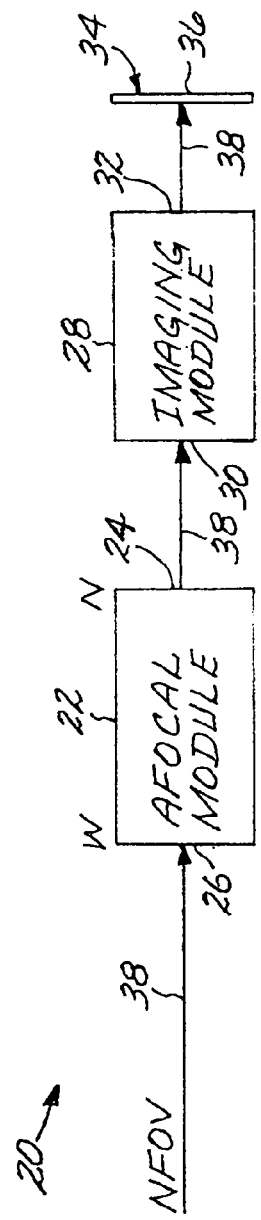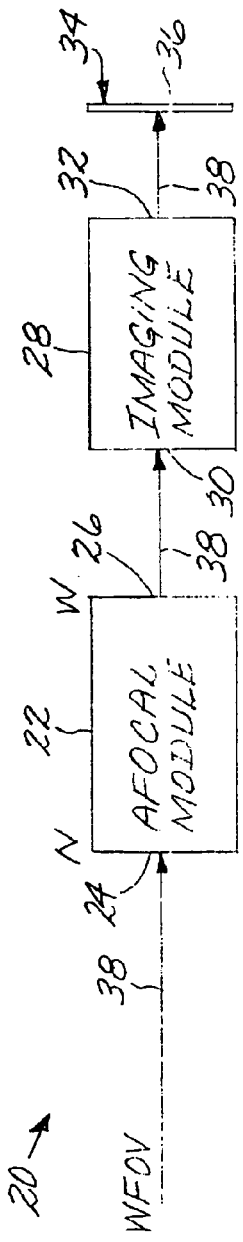

FIG. 10A

| NUMBER | SURFACE | RADIUS | CONIC CONSTANT | AD | AE |
|---|---|---|---|---|---|
| 1 | ENTRANCE PUPIL | — | — | — | — |
| 2 | PRIMARY MIRROR | -259.487 | -1.00755 | 7.727×10$^{-11}$ | -2.294×10$^{-14}$ |
| 3 | SECONDARY MIRROR | -108.336 | -28.1775 | 2.326×10$^{-07}$ | -1.959×10$^{-09}$ |
| 4 | TERTIARY MIRROR | -187.208 | -0.965842 | 8.474×10$^{-10}$ | -9.238×10$^{-13}$ |
| 5 | EXIT PUPIL | — | — | — | — |

AFOCAL MAGNIFICATION: 2.035X
NFOV: THROUGH ENTRANCE PUPIL: 45 cm DIAMETER APERTURE, APERTURE OFFSET +40 cm; 2.3 DEGREE DIAMETER FOV
THROUGH EXIT PUPIL: 22.1 cm DIAMETER APERTURE, APERTURE OFFSET -19.67 cm; 4.7 DEGREE DIAMETER FOV
WFOV: THROUGH ENTRANCE PUPIL: 22.1 cm DIAMETER APERTURE, APERTURE OFFSET +40 cm; 4.7 DEGREE DIAMETER FOV
THROUGH EXIT PUPIL: 10.9 cm DIAMETER APERTURE, APERTURE OFFSET: 19.67 cm; 9.4 DEGREE FOV

FIG. 10B

| NUMBER | SURFACE | AF | AG | THICKNESS | MATERIAL |
|---|---|---|---|---|---|
| 1 | ENTRANCE PUPIL | — | — | 182.552 | AIR |
| 2 | PRIMARY MIRROR | $3.691 \times 10^{-18}$ | $-1.248 \times 10^{-22}$ | $-112.969$ | REFLECT |
| 3 | SECONDARY MIRROR | $1.159 \times 10^{-11}$ | $-2.379 \times 10^{-14}$ | 118.966 | REFLECT |
| 4 | TERTIARY MIRROR | $5.346 \times 10^{-16}$ | $-1.066 \times 10^{-19}$ | $-191.020$ | REFLECT |
| 5 | EXIT PUPIL | — | — | — | AIR |

FIG. 11A

| NUMBER | SURFACE | RADIUS | CONIC CONSTANT | AD | AE |
|---|---|---|---|---|---|
| 1 | ENTRANCE PUPIL | — | — | — | — |
| 2 | PRIMARY MIRROR | -227.374 | -1.13090 | -1.480×10⁻¹⁰ | 2.256×10⁻¹³ |
| 3 | SECONDARY MIRROR | -927.448 | — | 6.383×10⁻⁰⁷ | -3.047×10⁻¹⁰ |
| 4 | TERTIARY MIRROR | 81.072 | 6.03469 | 1.930×10⁻⁰⁶ | -6.898×10⁻⁰⁹ |
| 5 | QUATERNARY MIRROR | 105.850 | -0.02427 | 8.427×10⁻¹⁰ | 5.735×10⁻¹³ |
| 6 | EXIT PUPIL | — | — | — | — |
| 7 | IMAGE PLANE | — | — | — | — |

FOCAL LENGTH: 132.67
ENTRANCE APERATURE: 22.1 DIAMETER, OFFSET +45.55
SPEED: F/6.00
FIELD OF VIEW: 4.7 DEGREES DIAMETER OFFSET 4.94 DEGREES
IMAGE INTERCEPT: -1.45, IMAGE TILT +0.427 DEGREES
PUPIL MAGNIFICATION: 3.59X

FIG.11B

| NUMBER | SURFACE | AF | A9 | THICKNESS | MATERIAL |
|---|---|---|---|---|---|
| 1 | ENTRANCE PUPIL | — | — | 161.294 | AIR |
| 2 | PRIMARY MIRROR | $-1.656 \times 10^{-17}$ | $1.155 \times 10^{-21}$ | $-87.213$ | REFLECT |
| 3 | SECONDARY MIRROR | $1.143 \times 10^{-13}$ | $-2.130 \times 10^{-17}$ | $39.740$ | REFLECT |
| 4 | TERTIARY MIRROR | $9.515 \times 10^{-12}$ | $-2.044 \times 10^{-14}$ | $-80.837$ | REFLECT |
| 5 | QUATERNARY MIRROR | $-1.437 \times 10^{-16}$ | $3.692 \times 10^{-20}$ | $91.870$ | REFLECT |
| 6 | EXIT PUPIL | — | — | 36.871 | AIR |
| 7 | IMAGE PLANE | — | — | — | AIR |

| PARAMETER | NFOV | MFOV | WFOV |
|---|---|---|---|
| APERTURE, cm | 45.0 | 22.1 | 10.9 |
| FIELD OF VIEW, DEG. | 2.3 | 4.7 | 9.5 |
| FOCAL LENGTH, cm | 270.0 | 132.7 | 65.2 |
| F-NUMBER | | F/6.0 | |
| IR PIXEL SIZE, μm | | 27 | |
| PIXEL SUBTENSE, μRAD | 10.0 | 20.3 | 41.4 |
| IR PIXEL COUNT | | 4K X 4K | |
| OPTICS | IMAGER THROUGH 2X FOREOPTICS | IMAGER ONLY | IMAGER THROUGH 0.5X FOREOPTICS |

FIG. 12

OPTICAL SYSTEM HAVING THREE FIELDS OF VIEW USING TWO ALL-REFLECTIVE OPTICAL MODULES

This invention relates to an optical system and, more particularly, to an all-reflective optical system in which the field of view may be switched.

BACKGROUND OF THE INVENTION

In one type of optical system, a light beam from a scene is processed through a set of optical elements to image the light beam onto a detector. The optical elements may be refractive, reflective, or a combination of each type. The detector converts the light signal to an electrical signal for further processing.

It is sometimes desirable that the optical system have more than one field of view (i.e., more than one focal length). In an example of interest, a spacecraft carrying an optical surveillance system overflies the earth in a roughly elliptical high earth orbit. The altitude of the spacecraft above the surface of the earth varies according to its position in the orbit. In order to keep the magnification of the image of the optical system approximately constant regardless of the position of the spacecraft in its orbit, the field of view and the focal length of the optical system must be changed.

One approach to providing the optical system with a changeable field of view is to utilize a zoom telescope in the optical system. The positions of the lenses or mirrors that form the zoom telescope may be varied axially along the light path to change the magnification, field of view, and focal length of the zoom telescope. Other types of zoom lenses may also be used. However, in all cases the optical systems with the zoom telescope are mechanically complex due to the need to move several lens or mirror groups with respect to each other. Significant boresight and image quality errors may also result. Additionally, the weight and volume of the zoom telescopes tend to be high, which is a significant disadvantage in spacecraft and aircraft applications.

There is a need for an improved approach to providing multiple fields of view in a optical system such as that used in a spacecraft in high earth orbit. The present invention fulfills this need, and further provides related advantages.

SUMMARY OF THE INVENTION

The present invention provides an optical system that achieves three selectable fields of view utilizing two all-reflective optical modules. Three discrete different fields of view is sufficient for applications such as an orbiting spacecraft in a roughly elliptical high earth orbit. The use of only two optical modules allows the optical system to be compact and light in weight. The optical system is all-reflective; that is, it uses only reflective optical components and no refractive optical components. Consequently, its operation is independent of the wavelength of the light beam and the individual wavelengths of the light beam. The use of only reflective optical elements also contributes to the low weight of the optical system.

In accordance with the invention, an all-reflective optical system comprises an all-reflective afocal module having a first optical end of the afocal module and a second optical end of the afocal module, and an all-reflective imaging module having an input optical end and an output optical end. The afocal module has a non-unity magnification between the first optical end and the second optical end. An all-reflective switching structure is operable to direct a light beam through the afocal module and the imaging module. A first position of the switching structure directs the light beam to enter the first optical end of the afocal module and exit the second optical end of the afocal module, and thereafter to enter the input optical end of the imaging module and to exit the output optical end of the imaging module. A second position of the switching structure directs the light beam to enter the second optical end of the afocal module and to exit the first optical end of the afocal module, and thereafter to enter the input optical end of the imaging module and to exit the output optical end of the imaging module. Desirably, the switching structure also has a third position in which the switching structure directs the light beam to enter the input optical end of the imaging module and to exit the output optical end of the imaging module, so that the light beam completely bypasses the afocal module.

Preferably, all reflective elements of the afocal module have a fixed positional relationship to each other, all reflective elements of the imaging module have a fixed positional relationship to each other, and the afocal module and the imaging module have a fixed positional relationship to each other.

Preferably, the switching structure comprises at least two flat mirrors. The switching structure may comprise exactly two flat mirrors. For example, the switching structure may comprise a first flat mirror facing the input optical end of the imaging module, and a second flat mirror pivotably mounted to switchably face the first optical end or the second optical end of the afocal module, and wherein the first flat mirror pivots with the second flat mirror to maintain a fixed optical relation to the second flat mirror. The switching structure may instead comprise more than two flat mirrors.

There is desirably a detector positioned in relation to the output optical end of the imaging module to receive light energy therefrom. The detector is preferably a focal plane array detector.

In another embodiment, an all-reflective optical system comprises an all-reflective afocal module having non-unity magnification, an all-reflective imaging module having an input optical end and an output optical end, and an all-reflective switching structure operable to direct a light beam through the afocal module and the imaging module. A first position of the switching structure directs the light beam to pass through the afocal module in a first direction and thereafter to enter the input optical end of the imaging module, and a second position of the switching structure directs the light beam to pass through the afocal module in a second direction and thereafter to enter the input optical end of the imaging module. Other compatible features discussed herein may be used with this embodiment.

The present approach thus provides an all-reflective optical system that is compact and light in weight, and operates independently of the wavelength components of the light beam. The optical system produces three different fields of view with only two different reflective optical modules. The optical modules desirably have their respective optical elements fixed in position relative to each other, and the two optical modules are also desirably fixed in position relative to each other.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic diagram of an optical system in its medium field of view configuration;

FIG. 2 is a schematic diagram of the optical system in its narrow field of view configuration;

FIG. 3 is a schematic diagram of the optical system in its wide field of view configuration;

FIGS. 10–12 present the optical prescription of the afocal module (FIG. 10) and the imaging module (FIG. 11) of a preferred embodiment, and the optical performance characteristics of the optical system using this afocal module and imaging module (FIG. 12).

DETAILED DESCRIPTION OF THE INVENTION

Figure 4:
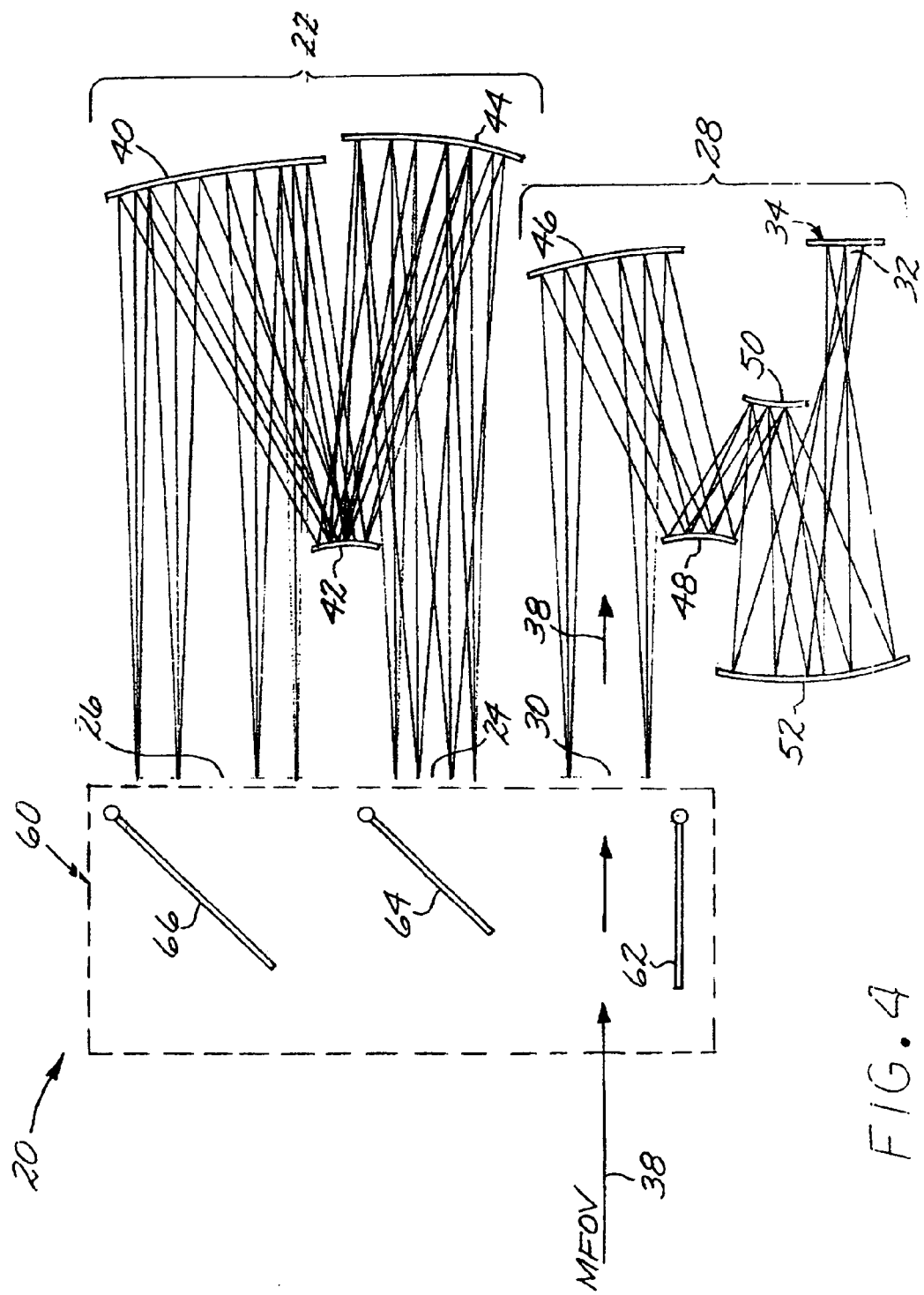
FIG. 4 is a schematic ray path drawing of a first embodiment of the optical system with its preferred afocal module and imaging module and in its medium field of view configuration.

FIGS. 1–3 depict an optical system 20 having an all-reflective afocal module 22 with a first optical end 24 (marked N in FIGS. 2–3) and a second optical end 26 (marked W in FIGS. 2–3). The afocal module 22 has a non-unity magnification between the first optical end 24 and the second optical end 26. The afocal module 22 is afocal because it does not produce a focused image output. In the configuration illustrated in FIG. 1, the afocal module 22 is absent, but it is present in the configurations illustrated in FIGS. 2–3.

The optical system 20 also has an all-reflective imaging module 28 having an input optical end 30 and an output optical end 32. The imaging module 28 does produce a focused image output.

A detector 34, preferably a focal plane array (FPA) detector 36, is in facing relation to the output optical end 32 of the imaging module 28.

The optical system 20 having only the two modules 22 and 28 may be used to produce three different fields of view. As illustrated in FIG. 1, a medium field of view (MFOV) is produced by imaging a light beam 38 from a scene onto the detector 34 using only the imaging module 28 and without the afocal module 22 involved in the optical path. As illustrated in FIG. 2, a narrow field of view (NFOV) is produced by imaging the light beam 38 onto the detector 34 using the afocal module 22 and the imaging module 28, arranged so that the light beam 38 enters the afocal module 22 through the second optical end 26 (W), leaves the afocal module 22 through the first optical end 24 (N), thereafter enters the imaging module 28 through the input optical end 30, leaves the imaging module 28 through the output optical end 32, and is incident upon the detector 34. As illustrated in FIG. 3, a wide field of view (WFOV) is produced by imaging the light beam 38 onto the detector 34 using the afocal module 22 and the imaging module 28, arranged so that the light beam 38 enters the afocal module 22 through the first optical end 24 (N), leaves the afocal module 22 through the second optical end 26 (W), thereafter enters the imaging module 28 through the input optical end 30, leaves the imaging module 28 through the output optical end 32, and is incident upon the detector 34.

The switching between the three configurations illustrated in FIGS. 1–3 is accomplished by a switching structure. The switching structure could operate by physically moving the afocal module 22 out of the light beam 38 as in FIG. 1, physically moving the afocal module 22 into the light beam 38 so that the light beam 38 enters the second optical end 26 as in FIG. 2, or physically inverting the afocal module 22 end-for-end so that the light beam 38 enters the first optical end 24 as in FIG. 3. This switching approach has drawbacks of requiring a large and relatively complex physical structure, and also of requiring great care in achieving optical alignment of the three configurations.

Figure 5:
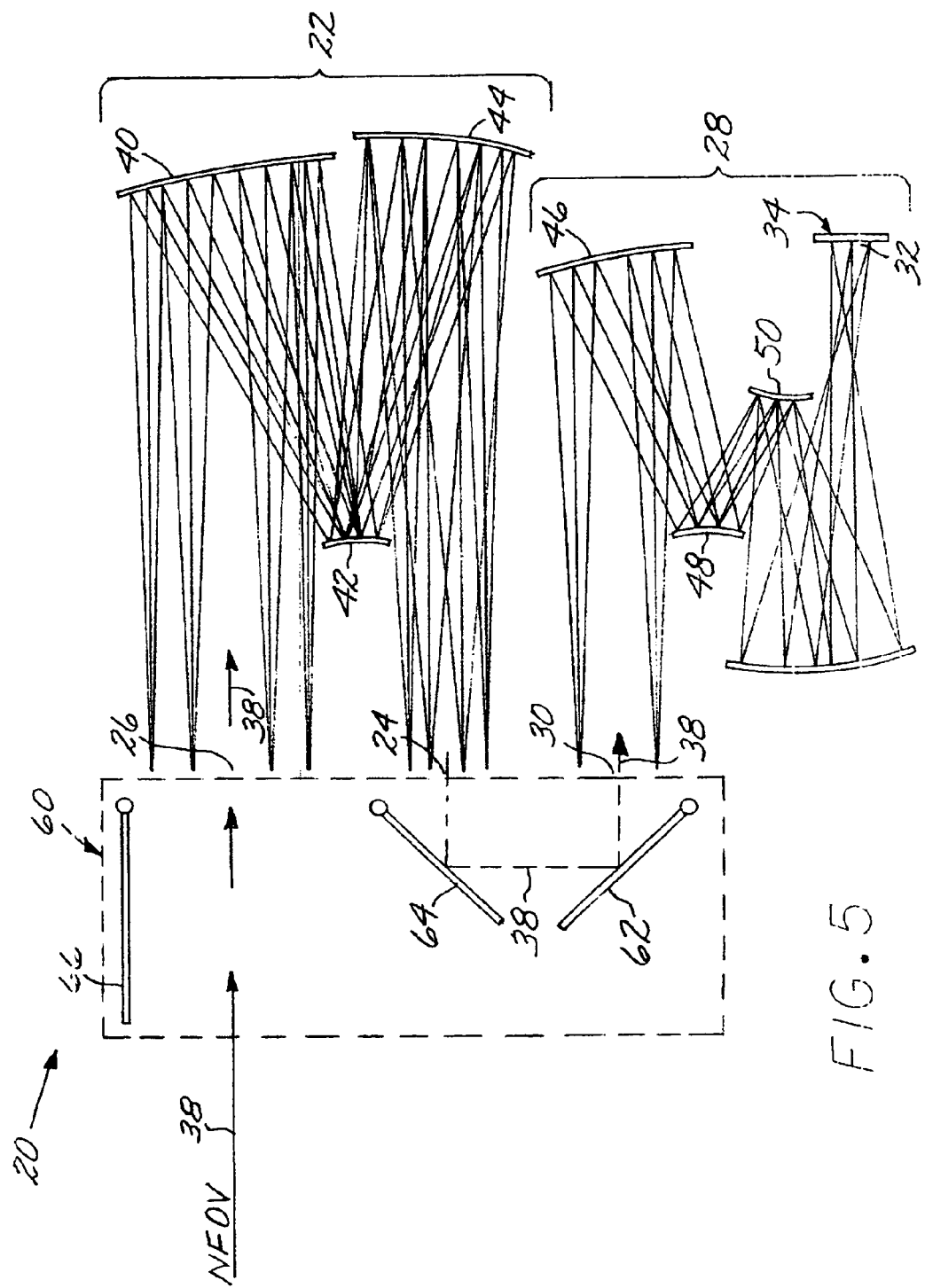
FIG. 5 is a schematic ray path drawing of the first embodiment of the optical system with its preferred afocal module and imaging module and in its narrow field of view configuration.
Figure 6:
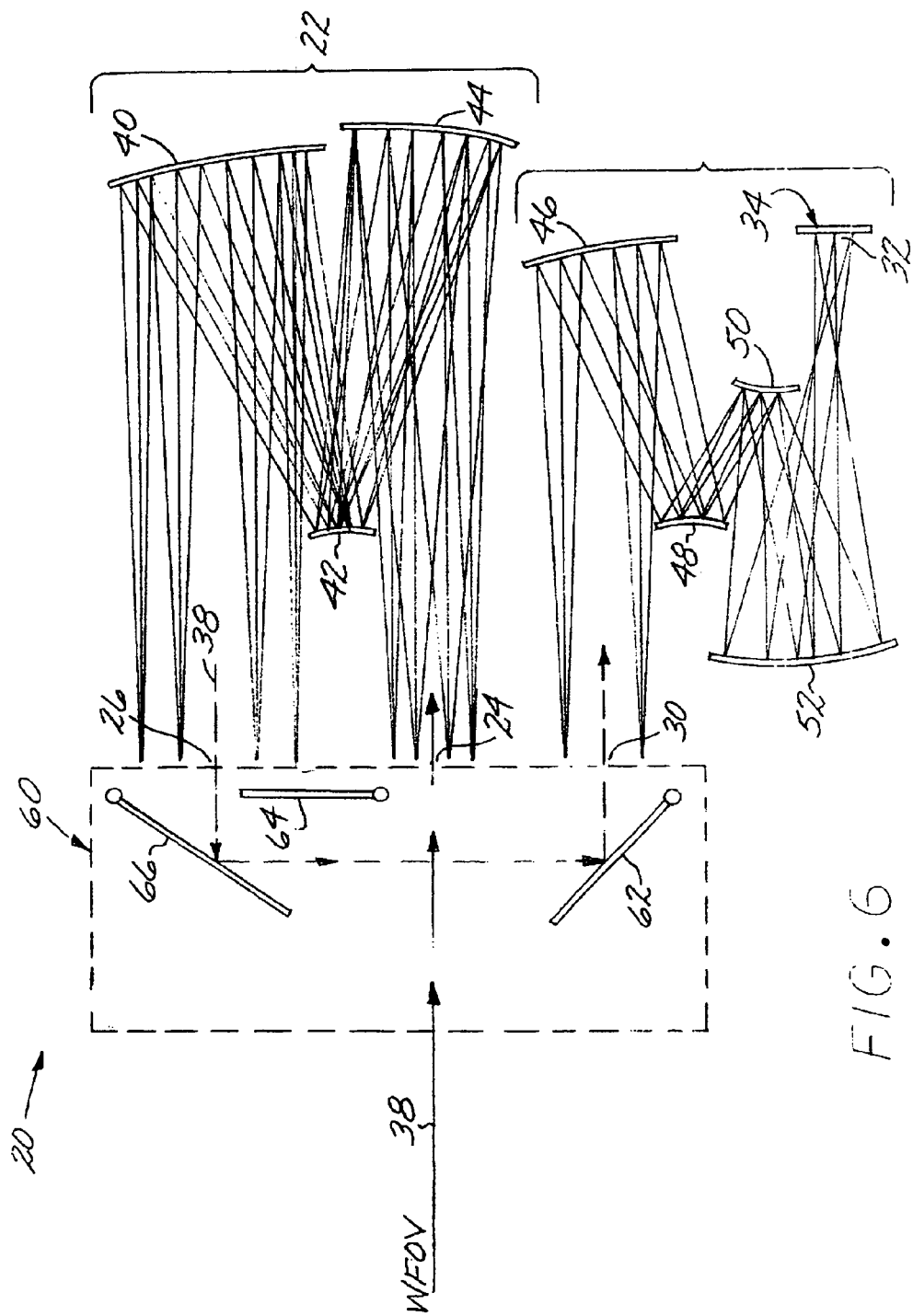
FIG. 6 is a schematic ray path drawing of the first embodiment of the optical system with its preferred afocal module and imaging module and in its wide field of view configuration.

Two preferred approaches for the switching structure using flat, unpowered mirrors have been developed. A first preferred embodiment for the afocal module 22, the imaging module 28, and the switching structure is illustrated in FIGS. 4–6, in which FIG. 4 corresponds to the MFOV configuration of FIG. 1, FIG. 5 corresponds to the NFOV configuration of FIG. 2, and FIG. 6 corresponds to the WFOV configuration of FIG. 3. Elements common with FIGS. 1–3 are given the same reference numbers, and the prior description is incorporated here. In each case illustrated in FIGS. 4–6, the afocal module 22 includes three mirrors 40, 42, and 44 arranged as an all-reflective afocal telescope, and the imaging module 28 includes four mirrors 46, 48, 50, and 52 arranged as an all-reflective relayed imager. The three mirrors 40, 42, and 44 of the afocal module 22 preferably have a fixed positional relation to each other to accomplish the telescope effect. The four mirrors 46, 48, 50, and 52 of the imaging module 28 preferably have a fixed positional relation to each other to accomplish the relayed imaging effect. The afocal module 22 and the imaging module 28 desirably have a fixed positional relation to each other, and all switching is accomplished as will be described subsequently.

By "fixed positional relation to each other" is meant that the various optical elements may optionally be adjusted as necessary to achieve optical alignment, but the optical elements are not changed in relative position or angular relation during service. (In other cases, the mounting structure may be made so precise that no adjustment is needed, avoiding the weight and bulk associated with an adjustment mechanism.) This fixed positional relation is an important benefit in each case, because it allows the optical elements to be constructed as the two modules 22 and 28, with switching accomplished as next discussed. Such an arrangement permits the modules and their support structure to be constructed inexpensively and with a lightweight structure.

The present approach is not limited to the specific illustrated preferred embodiments of the modules 22 and 28, and other designs of all-reflective afocal telescopes and all-reflective imagers may be used.

An all-reflective switching structure 60 is operable to direct a light beam through the afocal module 22 (for the configurations of FIGS. 5–6) and the imaging module 28

(for all of the configurations). A first position (wide field of view) of the switching structure 60, illustrated in FIG. 6, directs the light beam 38 to enter the first optical end 24 of the afocal module 22 and exit the second optical end 26 of the afocal module 22, and thereafter to enter the input optical end 30 of the imaging module 28 and to exit the output optical end 32 of the imaging module 28 to be incident upon the detector 34. A second position (narrow field of view) of the switching structure 60, illustrated in FIG. 5, directs the light beam 38 to enter the second optical end 26 of the afocal module 22 and to exit the first optical end 24 of the afocal module 22, and thereafter to enter the input optical end 30 of the imaging module 28 and to exit the output optical end 32 of the imaging module 28 to be incident upon the detector 34. A third position (medium field of view) of the switching structure 60, illustrated in FIG. 4, directs the light beam 38 to enter the input optical end 30 of the imaging module 28 and to exit the output optical end 32 of the imaging module 28 to be incident upon the detector 34, so that the light beam 38 completely bypasses the afocal module 22.

The switching structure 60 preferably comprises at least two flat mirrors, and no powered (curved) mirrors. In the embodiment of FIGS. 4–6, there are more than two flat mirrors, and in this case exactly three flat mirrors that are pivotably mounted to move in the manner to be described. A first flat mirror 62 is pivotable to controllably face the input optical end 30 of the imaging module 28 at an angle of 45 degrees, or to be pivoted away from the input optical end 30. A second flat mirror 64 is pivotable to controllably face the first optical end 24 of the afocal module 22 at an angle of 45 degrees, or to be pivoted away from the first optical end 24. A third flat mirror 66 is pivotable to controllably face the second optical end 26 of the afocal module 22 at an angle of 45 degrees, or to be pivoted away from the second optical end 26.

In the first position of the switching structure 60 illustrated in FIG. 6, the light beam 38 enters the first optical end 24 of the afocal module 22, with the second flat mirror 64 pivoted out of the way. The light beam 38 exits the second optical end 26 of the afocal module 22 and is reflected at an angle of 45 degrees from the third flat mirror 66. The light beam 38 passes to the first flat mirror 62 (the second flat mirror 64 is positioned so that it does not interfere with the light beam 38 during this passage), where it is reflected into the input optical end 30 of the imaging module 28.

In the second position of the switching structure 60 illustrated in FIG. 5, the light beam 38 enters the second optical end 26 of the afocal module 22, with the third flat mirror 66 pivoted out of the way. The light beam 38 exits the first optical end 24 of the afocal module 22 and is reflected at an angle of 45 degrees from the second flat mirror 64. The light beam 38 passes to the first flat mirror 62, where it is reflected into the input optical end 30 of the imaging module 28.

In the third position of the switching structure 60 illustrated in FIG. 4, the light beam 38 enters the input optical end 30 of the imaging module 28, with the first flat mirror 62 pivoted out of the way. The positions of the second flat mirror 64 and the third flat mirror 66 are not pertinent, because the light beam does not pass through the afocal module 22.

Thus, in the embodiment illustrated in FIGS. 4–6, the mirrors 40, 42, and 44 of the afocal module 22 remain in a fixed positional relation to each other, the mirrors 46, 48, 50, and 52 of the imaging module 28 remain in a fixed positional relation to each other, and the modules 22 and 28 remain in a fixed positional relation to each other. All light-path switching is accomplished by setting the positions of the three movable flat mirrors 62, 64, and 66 of the switching structure 60.

The afocal module 22 is preferably a telescope that may be characterized as having magnification M that is other than unity for the light beam 38 traveling in either direction through the afocal module 22. The imaging module 28 may be characterized as having a focal length F. The focal length of the optical system 20 is F/M in the WFOV configuration of FIG. 6, MF in the NFOV configuration of FIG. 5, and F in the MFOV configuration of FIG. 4.

Figure 7:
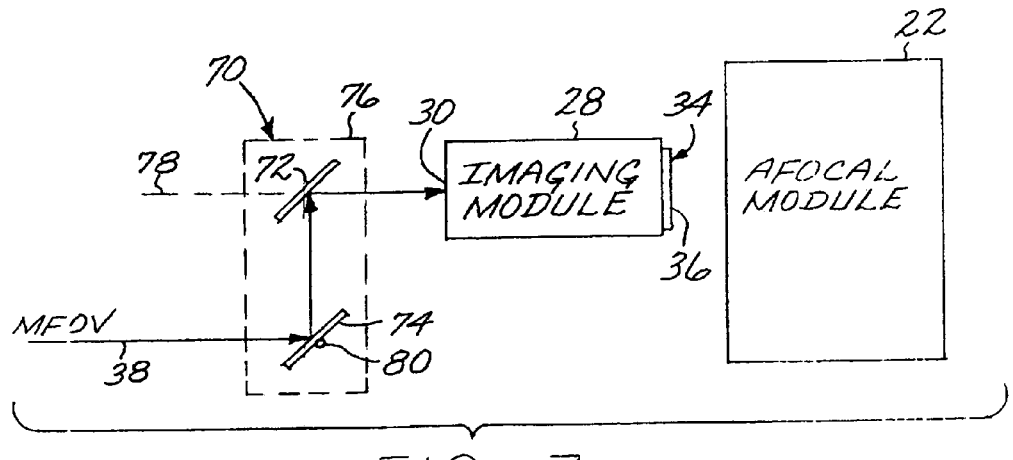
FIG. 7 is a schematic ray path drawing of a second embodiment of the optical system in its medium field of view configuration.
Figure 8:
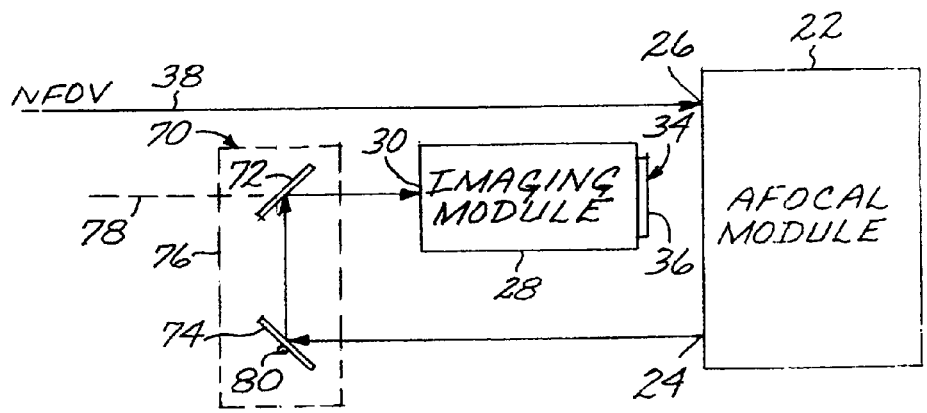
FIG. 8 is a schematic ray path drawing of the second embodiment of the optical system in its narrow field of view configuration.
Figure 9:
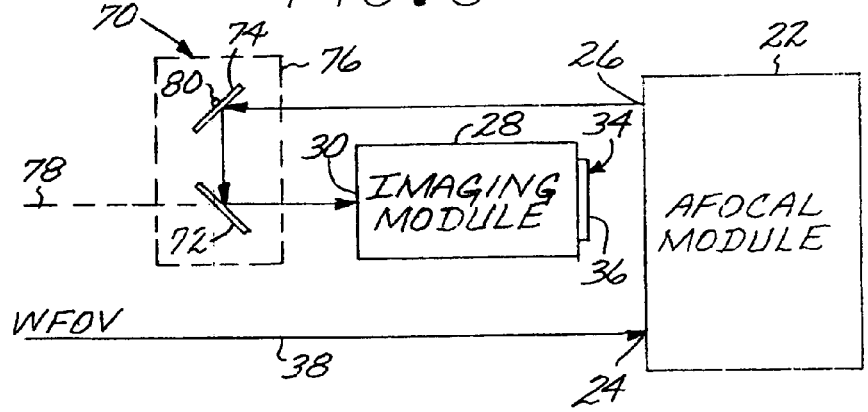
FIG. 9 is a schematic ray path drawing of the second embodiment of the optical system in its wide field of view configuration.

A second preferred embodiment for the afocal module 22, the imaging module 28, and the switching structure is illustrated in FIGS. 7–9, in which FIG. 7 corresponds to the MFOV configuration of FIG. 1, FIG. 8 corresponds to the NFOV configuration of FIG. 2, and FIG. 9 corresponds to the WFOV configuration of FIG. 3. Elements common with FIGS. 1–6 are given the same reference numbers, and the prior description is incorporated here. FIGS. 7–9 are in block form, without showing the detailed structure of the afocal module 22 and the imaging module 28. The preferred structures of the afocal module 22 and the imaging module 28 are as shown in FIGS. 4–6, and that description is incorporated here.

A switching structure 70 used with the second preferred embodiment of FIGS. 7–9 includes a first flat, unpowered mirror 72 and a second flat, unpowered mirror 74, together mounted in a support 76 that controllably pivots about an axis 78 that lies in the plane of the illustrations of FIGS. 7–9 and is aligned with the input end 30 of the imaging module 28. The mirror 72 is positioned to intercept the axis 78 and at an angle of 45 degrees to the axis 78. Within the support 76, the second mirror 74 controllably pivots through 90 degrees, between two positions that are each oriented at 45degrees to the light beam 38, about an axis 80 that lies perpendicular to the plane of the illustrations of FIGS. 7–9.

In the MFOV configuration of FIG. 7, the support 76 and the mirrors 72 and 74 are positioned so that the light beam 38 is reflected from the second mirror 74 to the first mirror 72, and thence to the imaging module 28 and the detector 34, without passing through the afocal module 22. To reach the NFOV configuration of FIG. 8 from the MFOV configuration of FIG. 7, the support 76 remains stationary and the second mirror 74 is pivoted 90 degrees about the axis 80. In this configuration, the light beam 38 enters the second optical end 26 of the afocal module 22, exits the first optical end 24 of the afocal module 22, reflects from the mirror 74 to the mirror 72, and thence enters the input optical end 30 of the imaging module 28 to thereafter fall on the detector 34. To reach the WFOV configuration of FIG. 9 from the NFOV configuration of FIG. 8, the support 76 pivots 180 degrees about the axis 78, and the mirror 74 does not pivot about the axis 80. In this configuration, the light beam 38 enters the first optical end 24 of the afocal module 22, exits the second optical end 26 of the afocal module 22, reflects from the mirror 74 to the mirror 72, and thence enters the input optical end 30 of the imaging module 28 to thereafter fall on the detector 34.

The first embodiment of FIGS. 4–6 uses more than two, specifically three, flat mirrors, and does not require any pivoting of the entire structure. The second embodiment of FIGS. 7–9 uses only two flat mirrors, but requires the pivoting support. The selection of one of these designs of the switching structure, or other designs accomplishing the required optical switching, to be used in a particular application will depend upon the requirements of the application.

A full optical design has been prepared for the illustrated embodiment of the afocal module 22 and the imaging module 28. FIG. 10 presents the optical prescription for the preferred afocal module 22, FIG. 11 presents the optical prescription for the preferred imaging module 28, and FIG. 12 sets forth the performance parameters of the optical system 20 using this afocal module 22 and imaging module 28. The afocal module 22 and the imaging module 28 may be used with any of the configurations of the embodiments of FIGS. 1–3, 4–6, and 7–9, as well as with other configurations.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An all-reflective optical system comprising:
   an all-reflective afocal module having a first optical end of the afocal module and a second optical end of the afocal module, wherein the afocal module has a non-unity magnification between the first optical end and the second optical end;
   an all-reflective imaging module having an input optical end and an output optical end; and
   an all-reflective switching structure operable to direct a light beam through the afocal module and the imaging module, wherein
      a first position of the switching structure directs the light beam to enter the first optical end of the afocal module and exit the second optical end of the afocal module, and thereafter to enter the input optical end of the imaging module and to exit the output optical end of the imaging module, and
      a second position of the switching structure directs the light beam to enter the second optical end of the afocal module and to exit the first optical end of the afocal module, and thereafter to enter the input optical end of the imaging module and to exit the output optical end of the imaging module.

2. The optical system of claim 1, wherein all reflective elements of the afocal module have a fixed positional relationship to each other.

3. The optical system of claim 1, wherein all reflective elements of the imaging module have a fixed positional relationship to each other.

4. The optical system of claim 1, wherein the afocal module and the imaging module have a fixed positional relationship to each other.

5. The optical system of claim 1, wherein the switching structure further has
   a third position in which the switching structure directs the light beam to enter the input optical end of the imaging module and to exit the output optical end of the imaging module, so that the light beam completely bypasses the afocal module.

6. The optical system of claim 1, wherein the switching structure comprises at least two flat mirrors.

7. The optical system of claim 1, wherein the switching structure comprises exactly two flat mirrors.

8. The optical system of claim 1, wherein the switching structure comprises
   a first flat mirror facing the input optical end of the imaging module, and
   a second flat mirror pivotably mounted to switchably face the first optical end or the second optical end of the afocal module, and wherein the first flat mirror pivots with the second flat mirror to maintain a fixed optical relation to the second flat mirror.

9. The optical system of claim 1, wherein the switching structure comprises more than two flat mirrors.

10. The optical system of claim 1, further including
    a detector positioned in relation to the output optical end of the imaging module to receive the light beam therefrom.

11. The optical system of claim 1, further including
    a focal plane array detector positioned in relation to the output optical end of the imaging module to receive the light beam therefrom.

12. An all-reflective optical system comprising:
    an all-reflective afocal module having a first optical end of the afocal module and a second optical end of the afocal module, wherein all reflective elements of the afocal module have a fixed positional relationship to each other, and wherein the afocal module has a non-unity magnification between the first optical end and the second optical end;
    an all-reflective imaging module having an input optical end and an output optical end, wherein all reflective elements of the imaging module have a fixed positional relationship to each other, and wherein the afocal module and the imaging module have a fixed positional relationship to each other;
    an all-reflective switching structure having at least two flat mirrors and operable to direct a light beam through the afocal module and the imaging module, wherein
       a first position of the switching structure directs the light beam to enter the first optical end of the afocal module and exit the second optical end of the afocal module, and thereafter to enter the input optical end of the imaging module and to exit the output optical end of the imaging module,
       a second position of the switching structure directs the light beam to enter the second optical end of the afocal module and to exit the first optical end of the afocal module, and thereafter to enter the input optical end of the imaging module and to exit the output optical end of the imaging module, and
       a third position in which the switching structure directs the light beam to enter the input optical end of the imaging module and to exit the output optical end of the imaging module, so that the light beam completely bypasses the afocal module; and
    a detector positioned in relation to the output optical end of the imaging module to receive the light beam therefrom.

13. The optical system of claim 12, wherein the switching structure comprises exactly two flat mirrors.

14. The optical system of claim 12, wherein the switching structure comprises
    a first flat mirror facing the input optical end of the imaging module, and
    a second flat mirror pivotably mounted to switchably face the first optical end or the second optical end of the afocal module, and wherein the first flat mirror pivots with the second flat mirror to maintain a fixed optical relation to the second flat mirror.

15. The optical system of claim 12, wherein the switching structure comprises more than two flat mirrors.

16. The optical system of claim 12, wherein the detector is a focal plane array detector.

17. An all-reflective optical system comprising:
an all-reflective afocal module having non-unity magnification;
an all-reflective imaging module having an input optical end and an output optical end; and
an all-reflective switching structure operable to direct a light beam through the afocal module and the imaging module, wherein
a first position of the switching structure directs the light beam to pass through the afocal module in a first direction and thereafter to enter the input optical end of the imaging module, and
a second position of the switching structure directs the light beam to pass through the afocal module in a second direction and thereafter to enter the input optical end of the imaging module.

18. The optical system of claim 17, wherein all reflective elements of the afocal module have a fixed positional relationship to each other, wherein all reflective elements of the imaging module have a fixed positional relationship to each other, and wherein the afocal module and the imaging module have a fixed positional relationship to each other.

19. The optical system of claim 17, wherein the switching structure comprises at least two flat mirrors.

20. The optical system of claim 17, further including
a detector positioned in relation to the output optical end of the imaging module to receive the light beam therefrom.

21. The optical system of claim 17, wherein the switching structure further has
a third position in which the switching structure directs the light beam to enter the input optical end of the imaging module and to exit the output optical end of the imaging module, so that the light beam completely bypasses the afocal module.

* * * * *